US006739388B2

(12) United States Patent
Nakagawa et al.

(10) Patent No.: US 6,739,388 B2
(45) Date of Patent: May 25, 2004

(54) AIR-CONDITIONING SYSTEM FOR A VEHICLE

(75) Inventors: Nobuya Nakagawa, Nishi-kasugai-gun (JP); Toshihisa Kondo, Nishi-kasugai-gun (JP); Kazuo Ishii, Nishi-kasugai-gun (JP); Masashi Fujita, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 4 days.

(21) Appl. No.: 10/198,460

(22) Filed: Jul. 19, 2002

(65) Prior Publication Data

US 2003/0019619 A1 Jan. 30, 2003

(30) Foreign Application Priority Data

Jul. 25, 2001 (JP) ........................................ 2001-224565

(51) Int. Cl.7 .............................. B60H 1/00; B60H 3/00
(52) U.S. Cl. ..................... 165/202; 165/204; 165/42; 165/43; 454/156; 62/244
(58) Field of Search ............................ 165/202, 42, 43, 165/204; 454/156; 62/244

(56) References Cited

U.S. PATENT DOCUMENTS

| 2,804,756 | A |   | 9/1957  | Faulhaber et al.           |
|-----------|---|---|---------|----------------------------|
| 4,763,564 | A | * | 8/1988  | Czarnecki et al. .... 62/244 |
| 5,619,862 | A | * | 4/1997  | Ruger et al. ......... 165/202 |
| 6,003,593 | A | * | 12/1999 | Halligan ............. 165/43 |
| 6,179,044 | B1 | * | 1/2001 | Tabara ............... 165/43 |
| 6,189,801 | B1 | * | 2/2001 | Klingler et al. ..... 237/12.3 B |
| 6,397,942 | B1 | * | 6/2002 | Ito et al. ........... 165/203 |
| 6,460,607 | B1 | * | 10/2002 | Shibata ............. 165/43 |

FOREIGN PATENT DOCUMENTS

| EP | 0 914 981  |   | 5/1999 |
|----|------------|---|--------|
| EP | 0936090    | * | 8/1999 |
| JP | 57-144118  | * | 9/1982 |
| JP | 58-133911  | * | 8/1983 |
| JP | 63-17107   | * | 1/1988 |
| JP | 7-61226    | * | 3/1995 |
| JP | 9-109654   | * | 4/1997 |
| JP | 10-250344  |   | 9/1998 |
| JP | 10-250345  |   | 9/1998 |
| JP | 11-70810   | * | 3/1999 |
| JP | 11-254948  | * | 9/1999 |

OTHER PUBLICATIONS

Patent Abstracts of Japan, JP 60–255522, Dec. 17, 1985.
Patent Abstracts of Japan, JP 61–188214, Aug. 21, 1986.

* cited by examiner

*Primary Examiner*—John K. Ford
(74) *Attorney, Agent, or Firm*—Oblon, Spivak, McClelland, Maier & Neustadt, P.C.

(57) ABSTRACT

An air conditioning system mountable in the rear of a vehicle having a vent mode and a foot mode is disclosed. The air conditioning system comprises a casing, an evaporator mounted at an upper front portion within the casing, a heater core mounted below the evaporator such that the evaporator and the heater core are not superposed when seen in a vehicle front-to-rear direction. A temperature controlling damper is provided for controlling rate of air which is directed toward the heater core so as to attain a selected final temperature of the air which is discharged into a passenger compartment of the vehicle. Vent and foot outlets are also provided.

2 Claims, 12 Drawing Sheets

VENT MODE
(MAX-COOL STATE)

VENT MODE
(MIX STATE)

VENT MODE
(MAX-HEAT STATE)

FOOT MODE
(MAX-COOL STATE)

FOOT MODE
(MIX STATE)

FOOT MODE
(MAX-HEAT STATE)

VENT MODE
(MAX-COOL STATE)

VENT MODE
(MIX STATE)

VENT MODE
(MAX-HEAT STATE)

FOOT MODE
(MAX-COOL STATE)

FOOT MODE
(MIX STATE)

FOOT MODE
(MAX-HEAT STATE)

AIR-CONDITIONING SYSTEM FOR A VEHICLE

BACKGROUND OF THE INVENTION

1. Field of the Invention

The present invention relates to an air conditioning system for a vehicle, and in particular to an air conditioning system mountable in the rear of a vehicle.

2. Description of the Related Art

Typically, a vehicle air conditioning system is mounted within the front of a vehicle, more particularly, within an instrumental panel thereof.

Recently, an air conditioning system has been developed which comprise an integral unit including an evaporator and a heater core. The evaporator is a heat exchanger providing a cooling capability and the heater core is a heat exchanger providing a heating capability. Thereby, the system provides an improved space availability in the lower area of a passenger compartment and also a reduction of the manufacturing cost.

Examples of the vehicle air conditioning system of the type having the integrated evaporator and heater core unit are disclosed in Japanese Patent Unexamined Publication Nos. 10-250344 and 10-250345. In the vehicle air conditioning system of these publications, the heater core is disposed behind the evaporator, and each of the heater core and the evaporator is in an upright position.

On the other hand, the conventional front-mounted air conditioning system of the above-mentioned type is not fully satisfactory in a so-called minivan having a larger compartment space due to a shortage of air conditioning capability thereof. To overcome this problem, an additional rear-mounted air conditioning system can be often installed in a space defined between a wheel housing for a rear wheel and a D-pillar (the most-rearward pillar-post of the vehicle).

However, such a space between the wheel housing for the rear wheel and the D-pillar is small and specifically the space is limited in a vehicle front-to-back direction. Further, the minivan-type vehicles may utilize sliding doors useful in providing a large opening through which passengers get on or off in order to give an easy access to the second and/or third rear seats for any passengers or occupants. Due to this, the rear wheel wells are displaced backward to some extent, which in turn may tend to further limit the space between the wheel housing and the D-pillar.

As a result, the rear-mounted air conditioning system must be installed in the limited space between the wheel housing and the D-pillar.

However, the conventional air conditioning systems as disclosed in the publications are relatively long in the vehicle front-to-back or longitudinal direction and therefore are difficult to conveniently install in the rear of the vehicle due to the space requirements.

SUMMARY OF THE INVENTION

It is therefore an object of the present invention to provide to provide an air conditioning system for vehicle having a reduced longitudinal dimension suitable for mounting in the rear of the vehicle.

The above object is achieved according to the first aspect of the present invention by providing an air conditioning system mountable in the rear of a vehicle having a vent mode and a foot mode, the air conditioning system comprising a casing, an evaporator mounted at an upper front portion within the casing, a heater core mounted below the evaporator such that the evaporator and the heater core are not superposed when seen in a vehicle front-to-back direction, a temperature controlling damper for controlling a rate of air which is directed toward the heater core so to attain a selected final temperature of the air which is discharged into a passenger compartment of the vehicle, a vent outlet provided at an upper rear portion of the casing for allowing the air having the selected temperature to be discharged into the passenger compartment in the vent mode, and a foot outlet provided at the front portion of the casing for allowing the air having the elected temperature to be discharged into the passenger compartment in the foot mode.

According to the first aspect of the present invention, since the evaporator and the heater core are not superposed when seen in a vehicle front-to-back direction, such arrangement provides a reduced longitudinal dimension of the air conditioning system, so that it can be conveniently located in a limited space between a wheel housing for a rear wheel and a D-pillar.

In the preferred embodiment of the present invention, the temperature controlling damper controls the rate of the air which is directed toward the heater core after flowing through the evaporator.

In the still preferred embodiment of the present invention, the temperature controlling damper controls the rate of the air which is directed toward the heater core before flowing through the evaporator.

The present invention also provides, in a second aspect, an air conditioning system mountable in the rear of a vehicle having a vent mode and a foot mode, the air conditioning system comprising a casing, an evaporator mounted at an upper front portion within the casing, a heater core mounted below the evaporator such that the evaporator and the heater core are not superposed when seen in a vehicle front-to-back direction, a vent outlet provided at the upper rear portion of the casing for allowing the air having a first selected final temperature to be discharged into the passenger compartment in the vent mode, a foot outlet provided at the front portion of the casing for allowing the air having a second selected final temperature to be discharged into the passenger compartment in the foot mode, a first bypass passage extending between the downstream side of the evaporator and the vent outlet, a second bypass passage extending between the downstream side of the evaporator and the foot outlet, a first heater core passage providing a fluid communication between the rear side of the heater core and the first bypass passage, a second heater core passage providing a fluid communication between the front side of the heater core and the second bypass passage, and a temperature controlling damper for controlling rate of air which is directed toward the heater core so as to attain the first or second selected temperature of the air which is discharged into a passenger compartment of the vehicle.

In a preferred embodiment of the present invention, the temperature controlling damper controls a proportion in which the rate of the air is divided into the first bypass passage and the second bypass passage.

The present invention provides, in a third aspect, an air conditioning system mountable in the rear of a vehicle having a vent mode and a foot mode, the air conditioning system comprising a casing, an evaporator mounted at the upper front portion within the casing, a heater core mounted below the evaporator such that the evaporator and the heater core are not superposed when seen in a vehicle front-to-back direction, a vent outlet provided at an upper rear portion of the casing for allowing the air having a first selected final temperature to be discharged into the passenger compartment in the vent mode, a foot outlet provided at the front portion of the casing for allowing the air having a second selected final temperature to be discharged into the passenger compartment in the foot mode, a first passage extending between the downstream side of the evaporator and the vent outlet, a first heater core passage providing a fluid communication between the rear side of the heater core and the first passage, a second heater core passage providing a fluid communication between the front side of the heater core and the upstream side of the evaporator, and a temperature controlling damper for controlling rate of air which is directed toward the heater core so as to attain the first or second selected temperature of the air which is discharged into a passenger compartment of the vehicle.

In a preferred embodiment of the present invention, the temperature controlling damper controls the rate of a portion of the air to flow through the evaporator and the rate of the remaining air to bypass the evaporator and flow through heater core in a controlled proportion.

In a still preferred embodiment of the present invention, the air conditioning system further comprises a drain passage disposed below the evaporator for draining a condensate from the evaporator, the drain passage having a generally funnel-like configuration.

In a further still preferred embodiment of the present invention, the temperature controlling damper has a projecting member integrally formed with the face of the damper facing the second heater core passage.

The above and other objects and features of the present invention will be apparent from the following description made with reference to the accompany drawings showing preferred embodiments of the present invention.

DETAILED DESCRIPTION OF THE PREFERRED EMBODIMENTS

Preferred embodiments of an air conditioning system for use in a vehicle according to the present invention will now be described with reference to the accompanying drawings.

Figure 1:
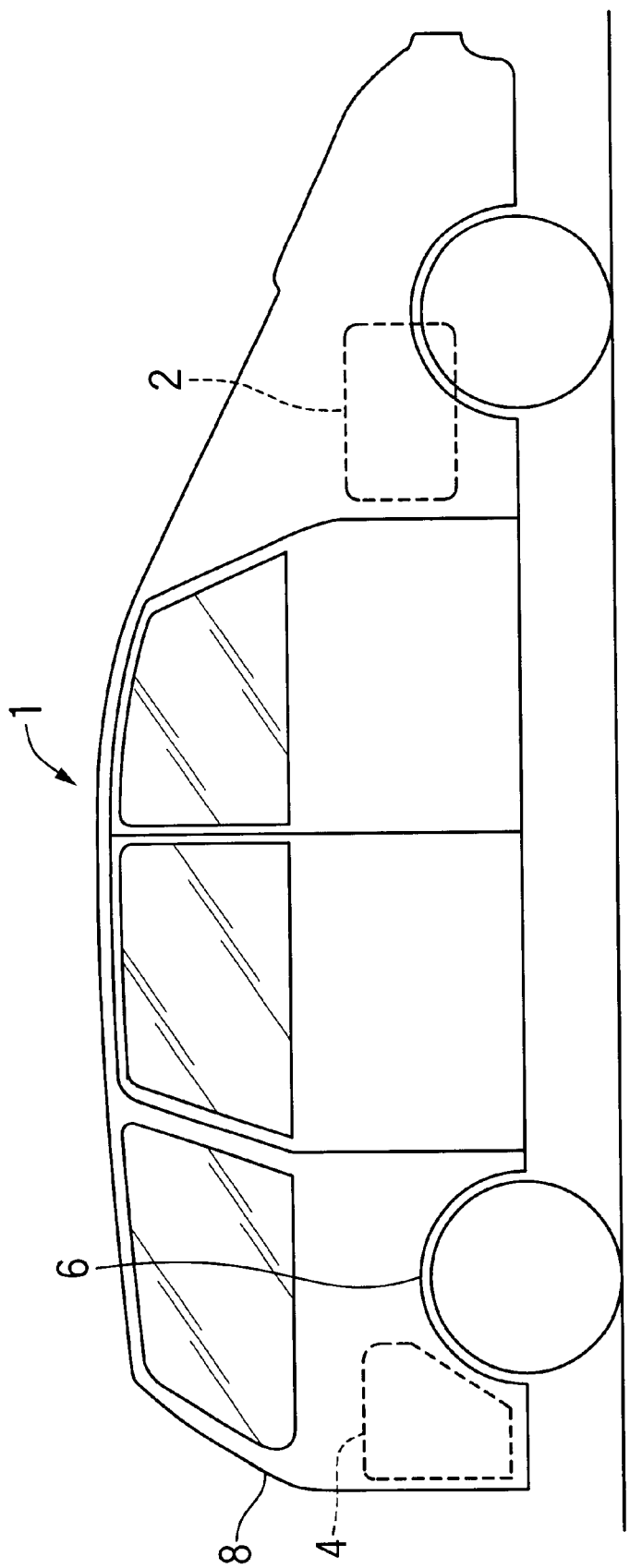
FIG. 1 is a schematic side elevational view of a vehicle having separate air conditioning units mounted in the front and rear of the vehicle.

Firstly, referring to FIGS. 1 to 8, a first embodiment of the vehicle air conditioning system of the present invention will be described below;

Referring to FIG. 1, a reference numeral 1 designates a vehicle or automotive of a so-called minivan type. The vehicle 1 has a conventional first air conditioner unit 2 located in an instrumental panel within the front thereof and a second air conditioner unit 4, which is a first embodiment of the present invention, located within the back or rear thereof. More specifically, the second air conditioner unit 4 is positioned within a limited space between a wheel housing 6 for a rear wheel and a D-pillar 8 which is the most-rearward pillar-post of the vehicle.

Figure 2:
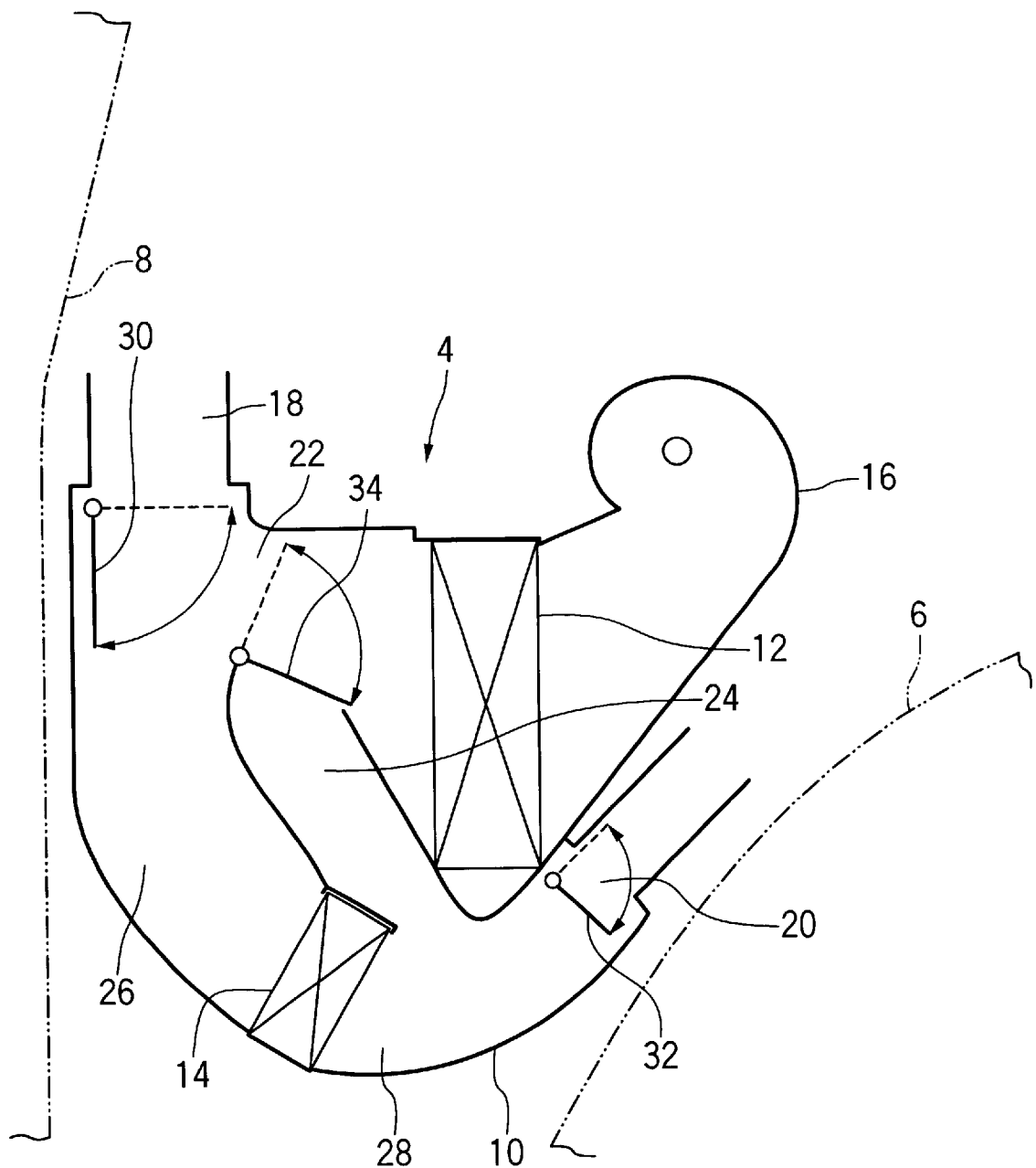
FIG. 2 is a sectional view of a first embodiment of the air conditioning system according to the present invention.

FIG. 2 schematically illustrates a basic construction of the second air conditioner unit 4 (hereinafter referred to as air conditioning system 4) according to the first embodiment of the present invention, a description of which will be given below.

Referring to FIG. 2, the air conditioning system 4 includes an air conditioning unit casing 10. An evaporator 12 working as a heat exchanger providing a cooling function is mounted generally in an upright position in the upper portion of the casing 10. A heater core 14 working as a heat exchanger providing a heating function is mounted below the bottom end of the evaporator 12 such that the heater core 14 and the evaporator 12 are not superposed when seen in a front-to-back direction of the vehicle. That is, the heater core 14 and the evaporator 12 are located within a relatively short distance or dimension in a vehicle front-to-back or longitudinal direction. The evaporator 12 is connected with a compressor (not shown) and a condenser (not shown) via a refrigerant conduit to complete a refrigerant circuit. The heater core 14 is located below a radiator (not shown) so that it can receive and utilize a hot engine coolant being fed by gravity from the radiator.

As shown, the evaporator 12 has an air intake duct 16 fluidly connected to the air intake side (upstream side) of the evaporator. At its upstream end, the air intake duct 16 is in fluid communication with one or more return air inlets (not shown) through which air is drawn from the passenger compartment of the vehicle into the air intake duct 16. The return air then flows into the evaporator 12 via the air duct 16.

The casing 10 is provided at its rear upper portion with at least one vent outlet 18 for discharging a conditioned air toward the upper portion of the passenger. The casing is further provided at its front lower portion with at least one foot outlet 20 for discharging a conditioned air toward the foot area of the passenger.

The first embodiment of the air conditioning system of the present invention can operate in two modes of a vent mode and a foot mode. The vent outlet 18 is open and the foot outlet is closed in the vent mode, and the vent outlet 18 is closed and the foot outlet 20 is open in the foot mode.

The evaporator 12 also has a first bypass passage 22 fluidly connected to the air discharge side (downstream side) of the evaporator and operatively placed in fluid communication with the vent outlet 18. In the vent mode of the air conditioning system, for example, after passing through the evaporator 12, the conditioned air may flow through the first bypass passage 22 and then out of the vent outlet 18 while bypassing the heater core 14. Also, the evaporator has a second bypass passage 24 fluidly connected to the air discharge side of the evaporator and operatively placed in fluid communication with foot outlet 20. In the foot mode of the air conditioning system, for example, after passing through the evaporator 12, the conditioned air may flow through the second bypass passage 24 and then out of the foot outlet 20 while bypassing the heater core 14.

The heater core 14 has a first heater core passage 26 fluidly connected to the rear side thereof and placed in fluid communication with the first bypass passage 22 and the vent outlet 18. The heater core 14 further has a second heater core passage 28 fluidly connected to the front side thereof and placed in fluid communication with the second bypass passage 24 and the foot outlet 20.

The vent outlet 18 is provided with a vent damper 30 working as a mode switching damper, while the foot outlet 20 is provided with a foot damper 32 working as a mode switching damper. In the vent mode, opening of the vent damper 30 can cause the vent outlet 18 to be open while at the same time closing of the foot damper 30 can cause the vent outlet to be closed. In the foot mode, closing of the vent damper 30 can cause the vent outlet 18 to be closed while at the same time opening of the foot damper 32 can cause the foot outlet 20 to be open.

A temperature controlling damper 34 is provided at the end of the second bypass passage associated with the evaporator 12 (i.e., at the inlet of the bypass passage 24). An opening of the temperature controlling damper 34 can be controlled so as to determine a proportion in which the rate of air after flowing through the evaporator 12 is divided into the first bypass passage 22 and the second bypass passage 24. The opening of the temperature controlling damper 34 can range from 0% to 100%. The temperature controlling damper 34 is operated so as to direct all of the air flow from the evaporator 12 toward the second bypass passage 24 at 100% opening of the damper. The temperature controlling damper 34 is operated so as to direct all of the air flow from the evaporator toward the first bypass passage 22 at 0% opening of the damper.

Figure 3:
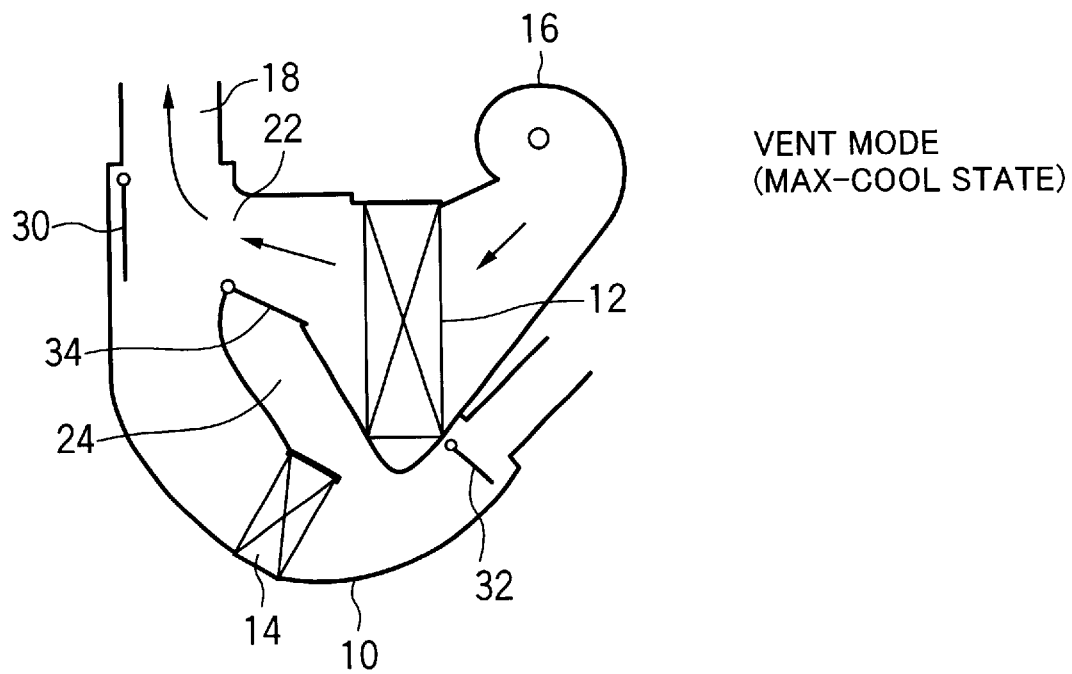
FIG. 3 is a view showing a flow pattern of air in the air conditioning system according to the first embodiment of the invention when in a vent mode (a max-cool state)
Figure 4:
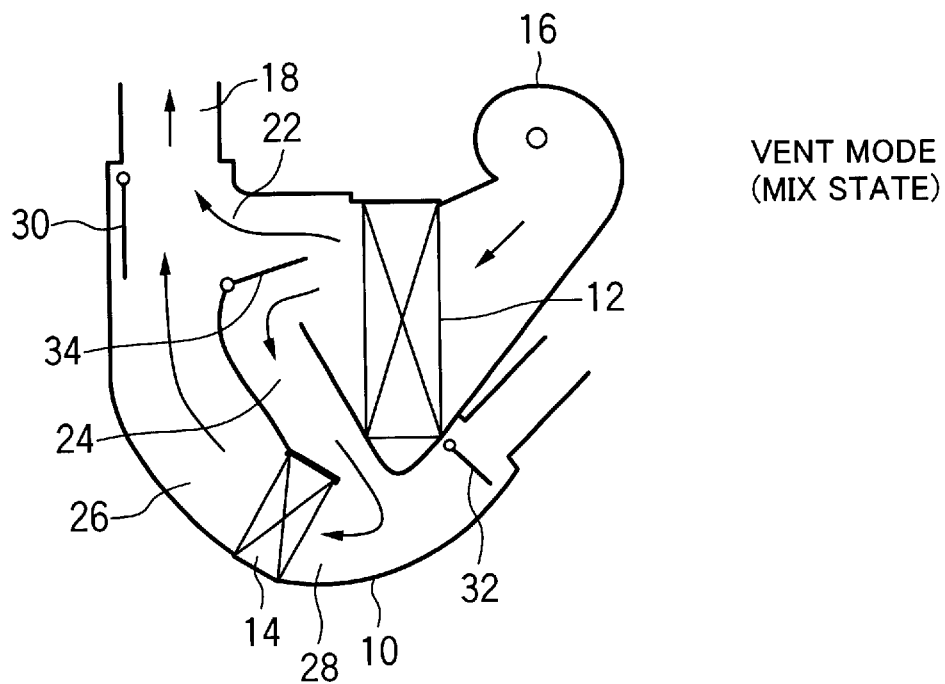
FIG. 4 is a view showing a flow pattern of the air in the air conditioning system according to the first embodiment of the invention when in a vent mode (a mix state)
Figure 5:
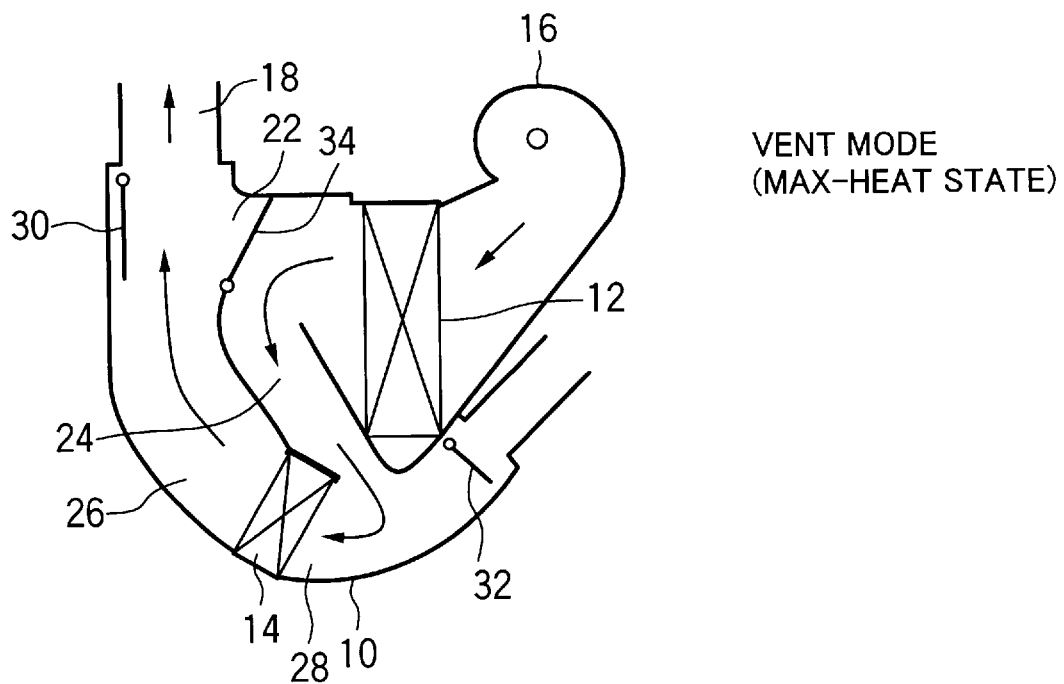
FIG. 5 is a view showing a flow pattern of the air in the air conditioning system according to the first embodiment of the invention when in a vent mode (a max-heat state)
Figure 6:
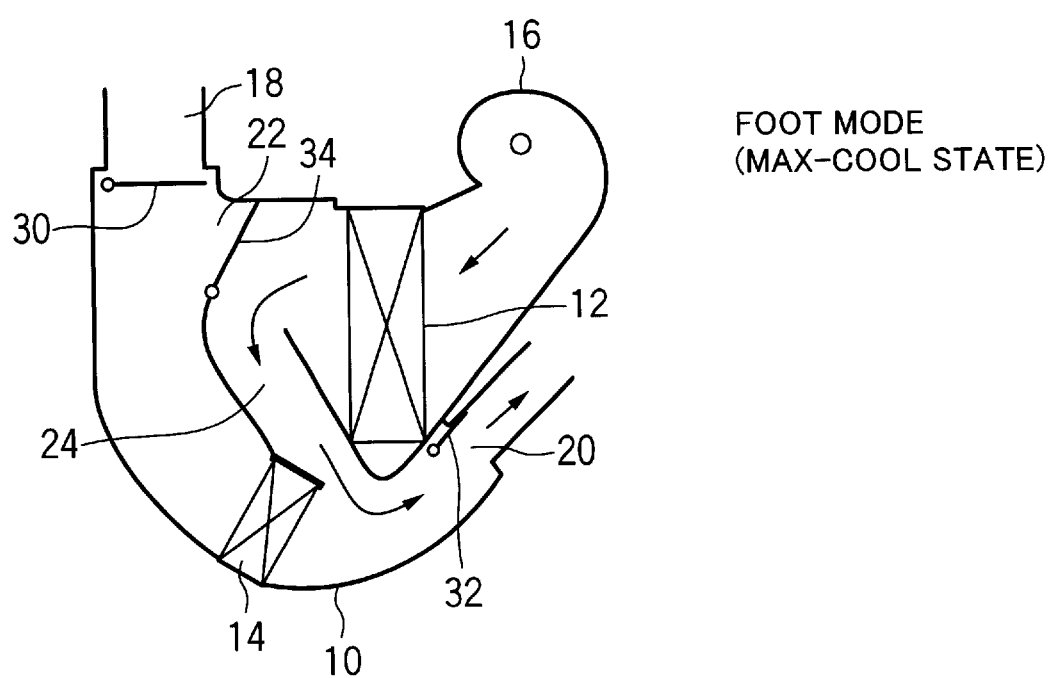
FIG. 6 is a view showing a flow pattern of the air in the air conditioning system according to the first embodiment of the invention when in a foot mode (a max-cool state)
Figure 7:
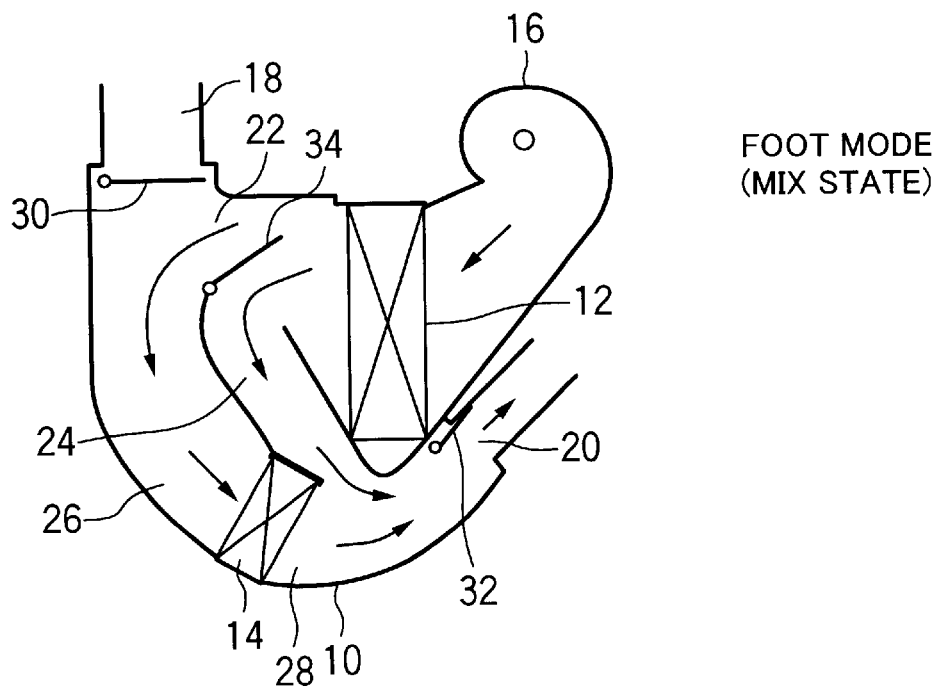
FIG. 7 is a view showing a flow pattern of the air in the air conditioning system according to the first embodiment of the invention when in a foot mode (a mix state)
Figure 8:
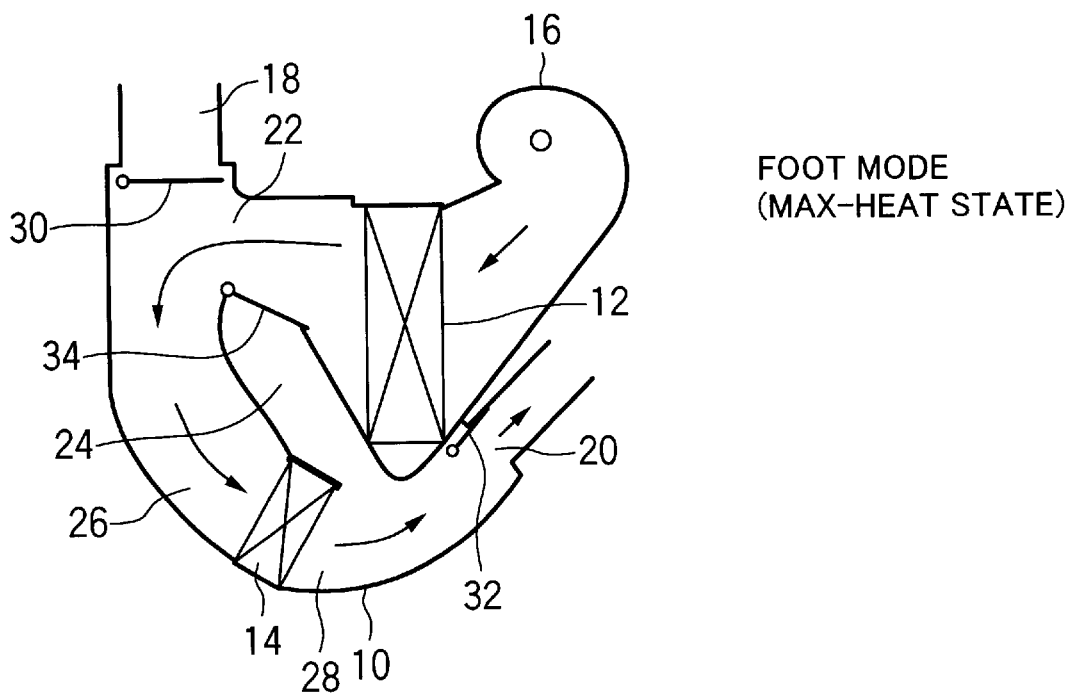
FIG. 8 is a view showing a flow pattern of the air in the air conditioning system according to the first embodiment of the invention when in a foot mode (a max-heat state)

An operation of the first embodiment of the air conditioning system according to the present invention will be described below. FIGS. 3 to 5 illustrate a flow pattern of the air in the air conditioning system 4 when the system is in the vent mode. FIGS. 6 to 8 illustrate a flow pattern of the air in the air conditioning system 4 when the system is in the FOOT mode.

Firstly, referring to FIG. 3, when it is desired that the conditioned air is discharged via the vent outlet 18 into the passenger compartment in its fully cooling state at a vent mode (a max-cool state), the vent damper 30 is opened and at the same time the foot damper 32 is closed while the temperature controlling damper 34 is in the fully closed position (at 0% opening thereof). Such operation of the dampers 30, 32 and 34 permits all of the air which is dehumidified and cooled by means of the evaporator 12 to a desired temperature to flow through the first bypass passage 22 to the vent outlet 18 and then into the passenger compartment. In this case, such air is preventing from being directed toward the heater core 14, i.e., flowing through the second bypass passage 24.

Secondly, referring to FIG. 4, when it is desired that the conditioned air is discharged via the vent outlet 18 into the passenger compartment at a desired temperature at a vent mode (a mix state), the vent damper 30 is opened and at the same time foot damper 32 is closed while the temperature controlling damper 34 is set to a predetermined opening (0% to 100% opening) depending on the desired temperature in the passenger compartment. In such operation of the dampers 30, 32 and 34, the air which is dehumidified and cooled by means of the evaporator 12, is caused to partly flow through the first bypass passage 22 to the vent outlet 18, while the remaining air flow is directed through the second bypass passage 24 and the second heater core passage 28 toward the heater core 14 where it experiences a rise in temperature. Then, the remaining air thus heated can flow to the vent outlet 18 where it mixes with the cooled air flow from the evaporator 12 to produce an air flow having a desired or selected final temperature which is then discharged into the passenger compartment via the vent outlet 18.

Thirdly, referring to FIG. 5, when it is desired that the conditioned air is discharged via the vent outlet 18 into the passenger compartment in its fully heating state at a vent mode (a max-heat state), the vent damper 30 is opened and at the same time the foot damper 32 is closed while the temperature controlling damper 34 is in the fully open position (at 100% opening thereof). Such operation of the dampers 30, 32, 34 permits all of the air which is dehumidified by means of the evaporator 12 to flow through the second bypass passage 24 and the second heater core passage 28 toward the heater core 14 where it experiences a rise in temperature. Then, the air thus heated can flow through the first vent passage 26 to the vent outlet 18 and then into the passenger compartment. In this case, such air is preventing from flowing through the first bypass passage 22.

Fourthly, referring to FIG. 6, when it is desired that the conditioned air is discharged via the foot outlet 20 into the passenger compartment in its fully cooling state at a foot mode (a max-cool state), the vent damper 30 is closed and at the same time the foot damper 32 is opened while the temperature controlling damper 34 is in the fully open position (at 100% opening thereof). Such operation of the dampers 30, 32 and 34 permits all of the air which is dehumidified and cooled by means of the evaporator 12 to a desired temperature to flow through the second bypass passage 24 to the foot outlet 20 and then into the passenger compartment. In this case, such air is preventing from being directing toward the heater core 14, i.e., flowing through the first bypass passage 22.

Fifthly, referring to FIG. 7, when it is desired that the conditioned air is discharged via the foot outlet 20 into the passenger compartment at a desired or selected final temperature at a foot mode (a mix state), the vent damper 30 is closed and at the same time foot damper 32 is opened while the temperature controlling damper 34 is set to a predetermined opening (0% to 100% opening) depending on the desired temperature in the passenger compartment. In such operation of the dampers 30, 32 and 34, the air which is dehumidified and cooled by means of the evaporator 12, is caused to partly flow through the first bypass passage 22 and the first heater core passage 26 to the heater core 14 where it experiences a rise in temperature. Then, the air thus heated can flow to the foot outlet 20, while the remaining air flow is directed through the second bypass passage 24 toward the foot outlet 20. The remaining air is prevented from flowing through the heater core 14. Then, the flow of the remaining air can pass to the foot outlet 20 where it mixes with the cooled air flow from the evaporator 12 to produce an air flow having a desired temperature which is then discharged into the passenger compartment via the foot outlet 20.

Sixthly, referring to FIG. 8, when it is desired that the conditioned air is discharged via the foot outlet 20 into the passenger compartment in its fully heating state at a foot mode (a max-heat state), the vent damper 30 is closed and at the same time the foot damper 32 is opened while the temperature controlling damper 34 is in the fully closed position (at 0% opening thereof). Such operation of the dampers 30, 32 and 34 permits all of the air which is dehumidified by means of the evaporator 12 to flow through the first bypass passage 22 and the first heater core passage 26 toward the heater core 14 where it experiences a rise in temperature. Then, the flow of the air thus heated can flow through the second heater core passage 28 to the foot outlet 20 and then into the passenger compartment. In this case, such air is preventing from flowing through the second bypass passage 24.

According to the first embodiment of the present invention, the arrangement of the evaporator 12 and the heater core 14 is such that they are not superposed when seen in the front-to-back direction or longitudinal direction of the vehicle. Such arrangement provides a reduced longitudinal dimension of the air conditioning system, so that it can be conveniently located in a limited space, e.g., the space between the wheel housing 6 for the rear wheel and the D-pillar.

Further, according to the first embodiment of the invention, opening of the temperature controlling damper 34 can be controlled so as to control a proportion in which the rate of the air is divided into the first and second bypass passages 22 and 24 located backward or downstream of the evaporator 12, thereby making it possible to discharge the air having a desired selected final temperature via either the vent outlet 18 or the foot outlet 20 into the passenger compartment.

Furthermore, according to the first embodiment, the first and second heater core passages 26 and 28 are located forwardly and backwardly of the heater core 14, respectively so as to be in fluid communication with the first and second bypass passages 22 and 24, respectively, thereby making it possible to provide a more compact air conditioning system.

Referring to FIGS. 9 to 18, a second embodiment of the vehicle air conditioning system of the invention will be described below.

Figure 9:
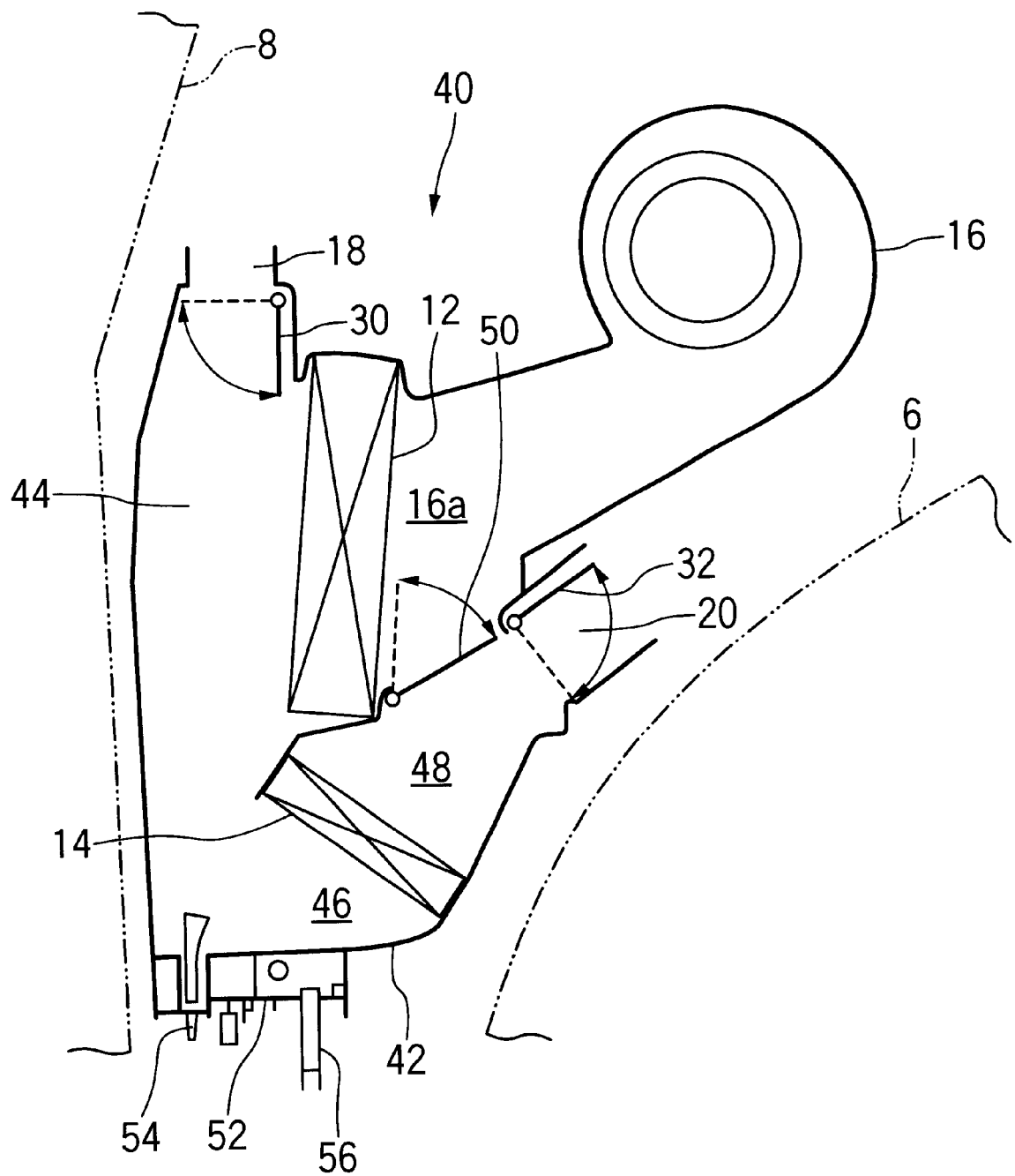
FIG. 9 is a sectional view of a second embodiment of the air conditioning system according to the present invention.

In FIG. 9, there is shown an air conditioning system designated reference numeral 40. As with the first embodiment, the air conditioning system 40 is positioned within a limited space between a wheel housing 6 for a rear wheel and a D-pillar 8 which is the most-rearward pillar-post of the vehicle 1 of the minivan-type.

The air conditioning system 40 includes an air conditioning casing 42. Evaporator 12 working as a heat exchanger providing a heating function is mounted generally in an upright position in the upper portion of the casing 42. A heater core 14 working as a heat exchanger providing a cooling function is mounted below the bottom end of the evaporator 12 such that the heater core 14 and the evaporator 12 are not superposed when seen in the front-to-back direction or longitudinal direction of the vehicle. That is, the heater core 14 and the evaporator 12 are located within a relatively short distance or dimension in a vehicle front-to-back or longitudinal direction. The evaporator 12 is connected with other components as with the first embodiment to complete a refrigerant circuit. The heater core 14 is located below a radiator (not shown) for the same reason as set forth above.

Preferably, the heater core 14 is disposed generally perpendicular to a flow direction of the air through the foot outlet 20 to provide a reduced flow resistance of the air through the heater core 14.

The evaporator 12 has an air intake duct 16 fluidly connected to the air intake side (upstream side) of the evaporator. As with the first embodiment, the air intake duct 16 at its upstream end is in fluid communication with one or more return air inlets (not shown) through which air is drawn from the passenger compartment of the vehicle into the air intake duct 16. The return air then flows into the evaporator 12 via the air duct 16.

The casing 42 is provided at its rear upper portion with at least one vent outlet 18 for discharging a conditioned air toward the upper portion of the passenger. The casing 42 is further provided at its front lower portion with at least one foot outlet 20 for discharging a conditioned air toward the foot area of the passenger.

As with the first embodiment, the second embodiment of the air conditioning system of the present invention can operate either in the vent mode or in the foot mode.

The evaporator 12 also has a first passage 44 fluidly connected to the air discharge side (downstream side) of the evaporator and operatively placed in fluid communication with the vent outlet 18. In the vent mode of the air conditioning system, for example, after passing through the evaporator 12, the conditioned air may flow through the first passage 44 and then out of the vent outlet 18 while bypassing the heater core 14.

The heater core 14 has a first heater core passage 46 fluidly connected to the rear side thereof and placed in fluid communication with the first passage 44 and vent outlet 18, and a second heater core passage 48 fluidly connected to the front side thereof and placed in fluid communication with the foot outlet 20 on the one hand and in direct communication with the upstream side of the evaporator 12, i.e., the downstream side 16*a* of the air intake duct 16 in such a manner not as to interpose the evaporator 12 therebetween on the other hand.

As with the first embodiment, the vent outlet 18 is provided with a vent damper 30 while the foot outlet 20 is provided with a foot damper 32. In the vent mode, opening of the vent damper 30 can cause the vent outlet 18 to be open while at the same time closing of the foot damper 30 can cause the vent outlet to be closed. In the foot mode, closing of the vent damper 30 can cause the vent outlet 18 to be closed while at the same time opening of the foot damper 32 can cause the foot outlet 20 to be open.

A temperature controlling damper 50 is provided between the second heater core passage 48 and the end 16a of the air intake duct 16. An opening of the temperature controlling damper 50 can be controlled so as to determine the rate of a portion of the air flowing through the air intake duct 16 into the evaporator 12 and the rate of the remaining air bypassing the evaporator 12 and entering into the second heater core passage 48 in a controlled proportion. Again, the opening of the temperature controlling damper 50 can range from 0% to 100%. The temperature controlling damper 50 is operated to direct all of the air flow from the air intake duct 16 toward the evaporator 12 at 0% opening of the temperature controlling damper 50 and to direct the air toward the evaporator 12 and the second heater core passage 48 in a predetermined ratio at 100% opening of the damper.

The casing 42 is connected at its lower end to a floor panel 52 of the vehicle. As shown, the floor panel 52 is provided with a drain conduit 54 for draining any condensate from the evaporator 12 and a conduit for use with the heater core.

Figure 10:
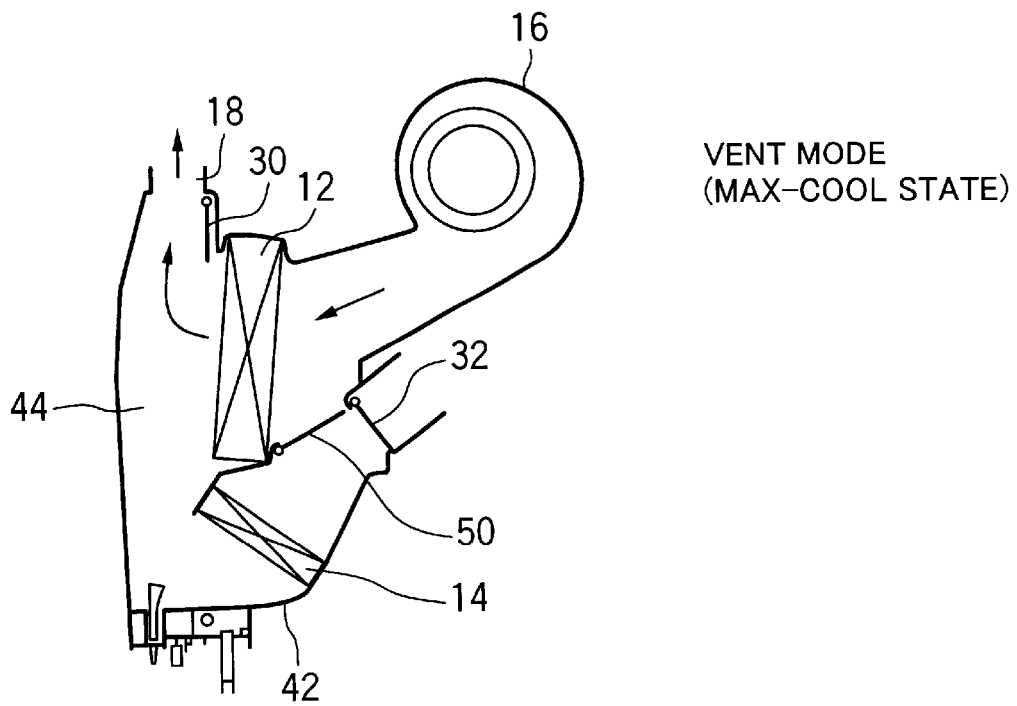
FIG. 10 is a view showing a flow pattern of the air in the air conditioning system according to the second embodiment of the invention when in a vent mode (a max-cool state)
Figure 11:
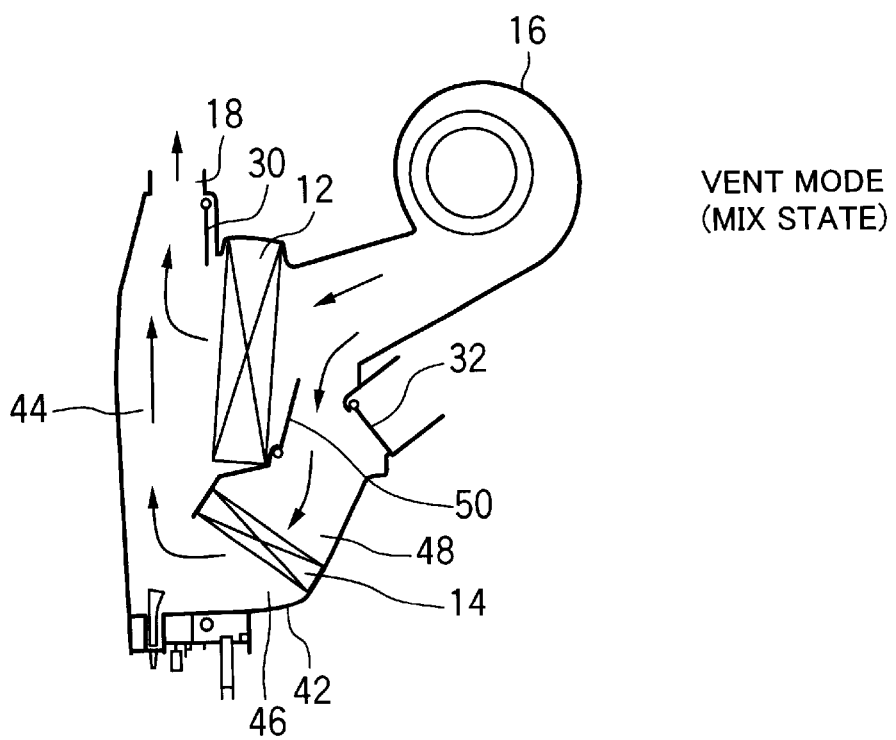
FIG. 11 is a view showing a flow pattern of the air in the air conditioning system according to the second embodiment of the invention when in a vent mode (a mix state)
Figure 12:
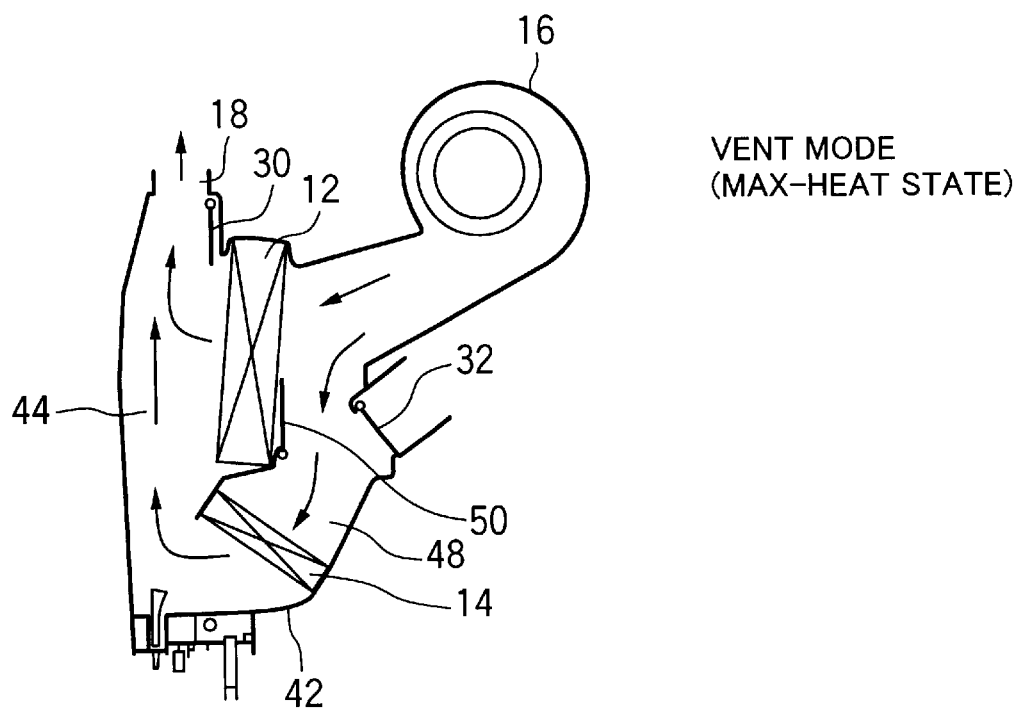
FIG. 12 is a view showing a flow pattern of the air in the air conditioning system according to the second embodiment of the invention when in a vent mode (a max-heat state)
Figure 13:
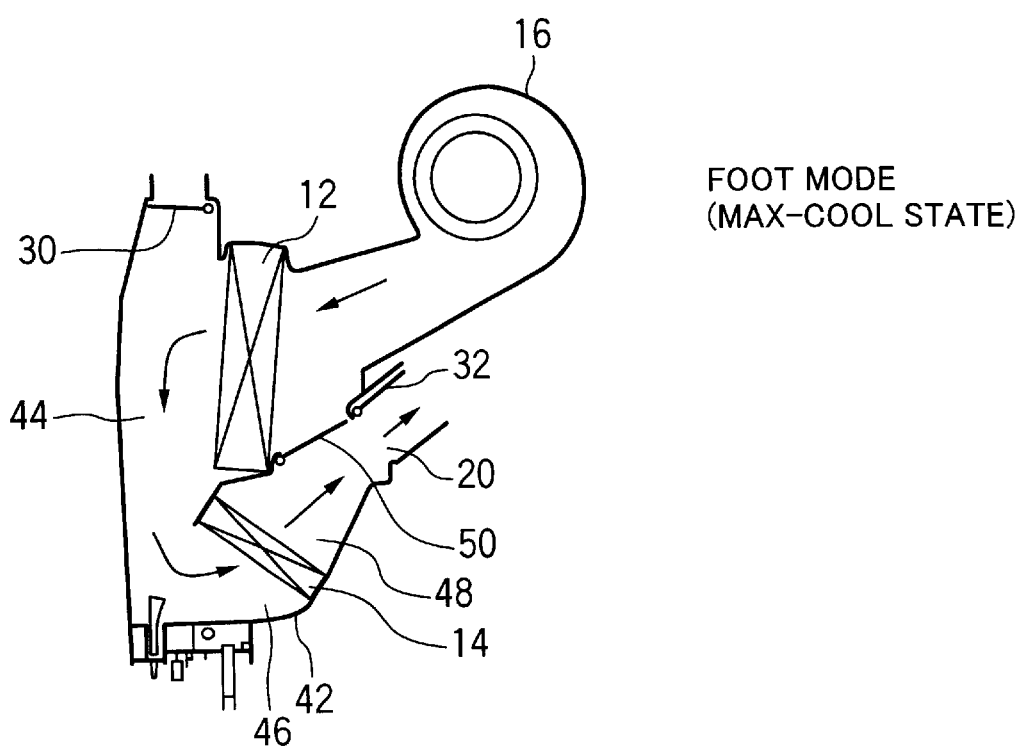
FIG. 13 is a view showing a flow pattern of the air in the air conditioning system according to the second embodiment of the invention when in a foot mode (a max-cool state)
Figure 14:
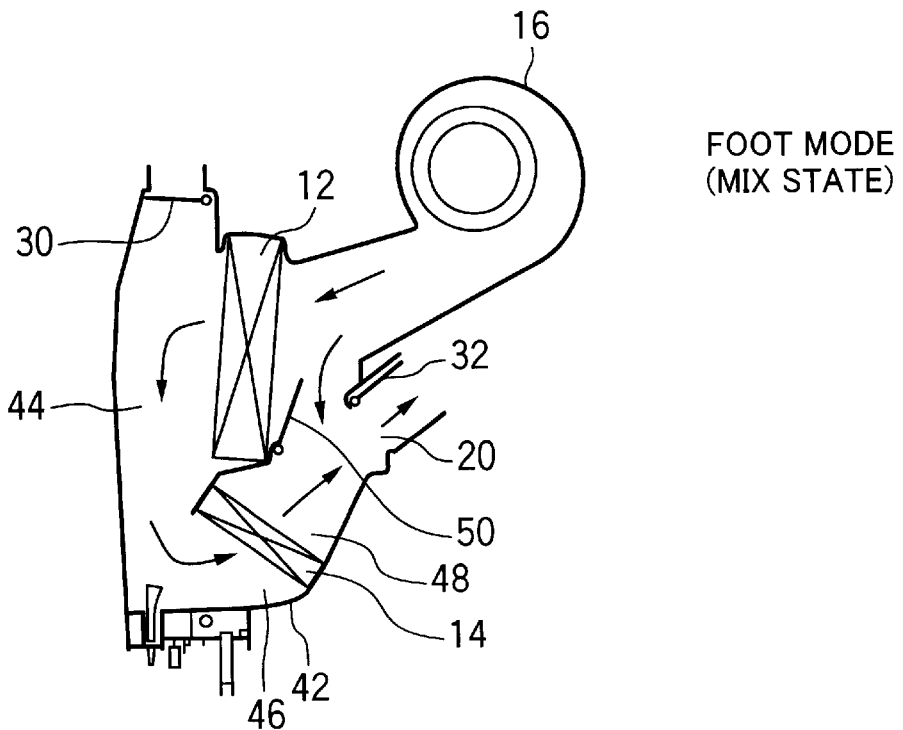
FIG. 14 is a view showing a flow pattern of the air in the air conditioning system according to the second embodiment of the invention when in a foot mode (a mix state)
Figure 15:
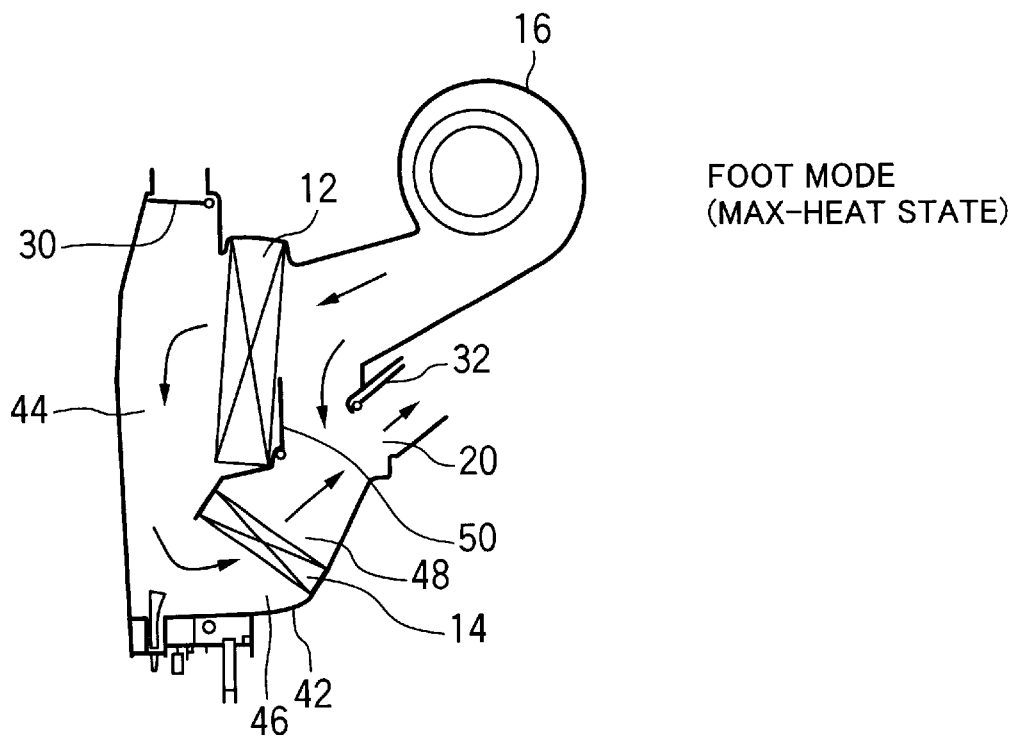
FIG. 15 is a view showing a flow pattern of the air in the air conditioning system according to the second embodiment of the invention when in a foot mode (a max-heat state)

An operation of the second embodiment of the air conditioning system according to the present invention will be described below. FIGS. 10 to 12 illustrate an air flow in the air conditioning system 40 when the system is in the vent mode. FIGS. 13 to 15 illustrate an air flow in the air conditioning system 4 when the system is in the foot mode.

Firstly, referring to FIG. 10, when it is desired that the conditioned air is discharged via the vent outlet 18 into the passenger compartment in its fully cooling state at a vent mode (a max-cool state), the vent damper 30 is opened and at the same time the foot damper 32 is closed while the temperature controlling damper 50 is in the fully closed position (at 0% opening thereof). Such operation of the dampers 30, 32 and 50 permits all of the air flowing through the air intake duct 16 to be directed toward the evaporator 12 where it is dehumidified and cooled to a desired temperature. The air having the desired temperature then flows through the first passage 44 to the vent outlet 18 and then into the passenger compartment. In this case, it is noted that such air is preventing from flowing through the heater core 14.

Secondly, referring to FIG. 11, when it is desired that the conditioned air is discharged via the vent outlet 18 into the passenger compartment at a desired temperature at a vent mode (a mix state), the vent damper 30 is opened and at the same time foot damper 32 is closed while the temperature controlling damper 50 is set to a first predetermined opening (0% to 100% opening) depending on the desired temperature in the passenger compartment. In such operation of the dampers 30, 32 and 50, a portion of the air flowing through the air intake duct 16 is caused to flow into the evaporator 12 where it is dehumidified and cooled. Such air portion then flows through the first passage 44 to the vent outlet 18. The remaining air from the air intake duct 16 bypasses the evaporator 12 and flows directly through the second heater core passage 48 toward the heater core 14 where it experiences a rise in temperature. Then, the remaining air thus heated can flow through the first heater core passage 46 and the first passage 44 to the vent outlet 18 where it mixes with the cooled air flow from the evaporator 12 to produce an air flow having a desired temperature which is then discharged into the passenger compartment via the vent outlet 18.

Thirdly, referring to FIG. 12, when it is desired that the conditioned air is discharged via the vent outlet 18 into the passenger compartment in its fully heating state at a vent mode (a max-heat state), the vent damper 30 is opened and at the same time the foot damper 32 is closed while the temperature controlling damper 50 is in the fully open position (at 100% opening thereof). In such operation of the dampers 30, 32 and 50, a portion (minimum in flow rate) of the air flowing through the air intake duct 16 is caused to flow into the evaporator 12 where it is dehumidified and cooled. Such air portion flows through the first passage 44 to the vent outlet 18. The remaining air (maximum in flow rate) from the air intake duct 16 bypasses the evaporator 12 and flows directly through the second heater core passage 48 toward the heater core 14 where it experiences a rise in temperature. Then, the remaining air thus heated can flow through the first heater core passage 46 and the first passage 44 to the vent outlet 18 where it mixes with the dehumidified air flow from the evaporator 12 to produce an air flow having a desired or selected final temperature which is then discharged into the passenger compartment via the vent outlet 18.

Fourthly, referring to FIG. 13, when it is desired that the conditioned air is discharged via the foot outlet 20 into the passenger compartment in its fully cooling state at a foot mode (a max-cool state), the vent damper 30 is closed and at the same time the foot damper 32 is opened while the temperature controlling damper 50 is in the fully closed position (at 0% opening thereof). Such operation of the dampers 30, 32 and 50 permits all of the air flowing through the air intake duct 16 to be directed toward the evaporator 12 where it is dehumidified and cooled to a desired temperature. The air having the desired temperature then flows through the first passage 44, the first heater core passage 46, the heater core 14 and then the second heater core passage 48 to the foot outlet 20 and then into the passenger compartment Fifthly, referring to FIG. 14, when it is desired that the conditioned air is discharged via the foot outlet 20 into the passenger compartment at a desired temperature at a foot mode (a mix state), the vent damper 30 is closed and at the same time foot damper 32 is opened while the temperature controlling damper 50 is set to a second predetermined opening (0% to 100% opening) depending on the desired temperature in the passenger compartment. In such operation of the dampers 30, 32 and 50, a portion of the air flowing through the air intake duct 16 is caused to flow into the evaporator 12 where it is dehumidified and cooled. Such air portion then flows through the first passage 44 and the first heater core 46 to the heater core 14 where it is heated to a predetermined temperature. Then, the air portion flows to the foot outlet 20. The remaining air from the air intake duct 16 flows directly into the second heater core passage 48 by bypassing both of the evaporator 12 and the heater core 14, i.e., while subjecting to neither of cooling nor heating. Such the remaining flow of the unconditioned air flows to the foot outlet 20 where it is mixed with the conditioned air flow to produce an air flow having a desired temperature which is then discharged into the passenger compartment via the foot outlet 20.

Sixthly, referring to FIG. 15, when it is desired that the conditioned air is discharged via the foot outlet 20 into the passenger compartment in its fully heating state at a foot mode (a max-heat state), the vent damper 30 is closed and at the same time the foot damper 32 is opened while the temperature controlling damper 50 is in the fully open position (at 100% opening thereof). In such operation of the dampers 30, 32 and 50, a portion (minimum in flow rate) of the air flowing through the air intake duct 16 is caused to flow into the evaporator 12 where it is dehumidified and cooled. Such air portion flows through the first passage 44 and the first heater core 46 to the heater core 14 where it is heated to a predetermined temperature. Then, the air portion flows to the foot outlet 20. The flow of the remaining air from the air intake duct 16 flows directly into the second heater core passage 48 by bypassing both of the evaporator 12 and the heater core 14, i.e., while subjecting to neither of cooling nor heating. Such the remaining flow of the unconditioned air flows to the foot outlet 20 where it is mixed with the conditioned air flow to produce an air flow having a desired temperature which is then discharged into the passenger compartment via the foot outlet 20.

According to the second embodiment of the present invention, the arrangement of the evaporator 12 and the heater core 14 is such that they are not superposed when seen in the front-to-back direction or longitudinal direction of the vehicle, as with the first embodiment described above. Such arrangement provides a reduced longitudinal dimension of the air conditioning system 40, so that it can be conveniently located in a limited space, e.g., the space between the wheel wells 6 for the rear wheels and the D-pillar.

Further, according to the second embodiment of the present invention, opening of the temperature controlling damper 50 which is disposed between the second heater core passage 48 and the downstream side 16a of the air intake duct 16 can be controlled so as to determine the rate of the air flowing through the air intake duct into the evaporator 12 and the rate of the air bypassing the evaporator 12 and flowing directly into the second heater core in a controlled proportion, thereby making it possible to discharge the air having a desired temperature via either the vent outlet 18 or the foot outlet 20 into the passenger compartment.

Furthermore, according to the second embodiment, in view of the fact that the temperature controlling damper 50 is disposed between the second heater core passage 48 and the downstream side 16a of the air intake duct 16 so that the unconditioned air, i.e., the air bypassing the evaporator 12 can be passed through the second heater core passage 48, the temperature controlling capacity provided by the air conditioning system of the second embodiment might be less than that of the first embodiment. However, the air conditioning system of the second embodiment is more compact than that of the first embodiment due to a simplified arrangement of the ducts in the casing 42.

Figure 16:
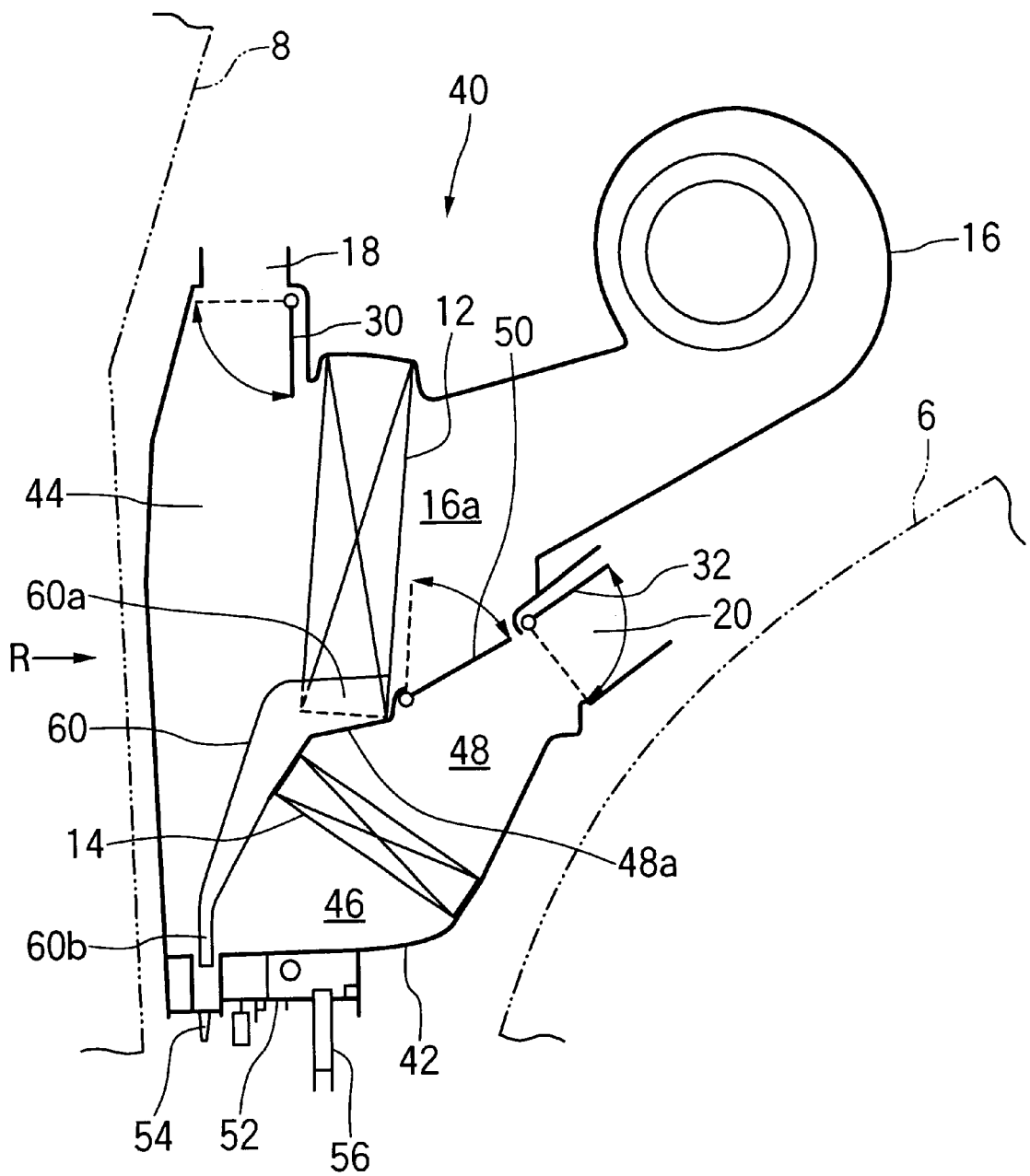
FIG. 16 is a cross sectional view of the vehicle air conditioning system including a drain passage according to another example of the second embodiment of the invention.
Figure 17:
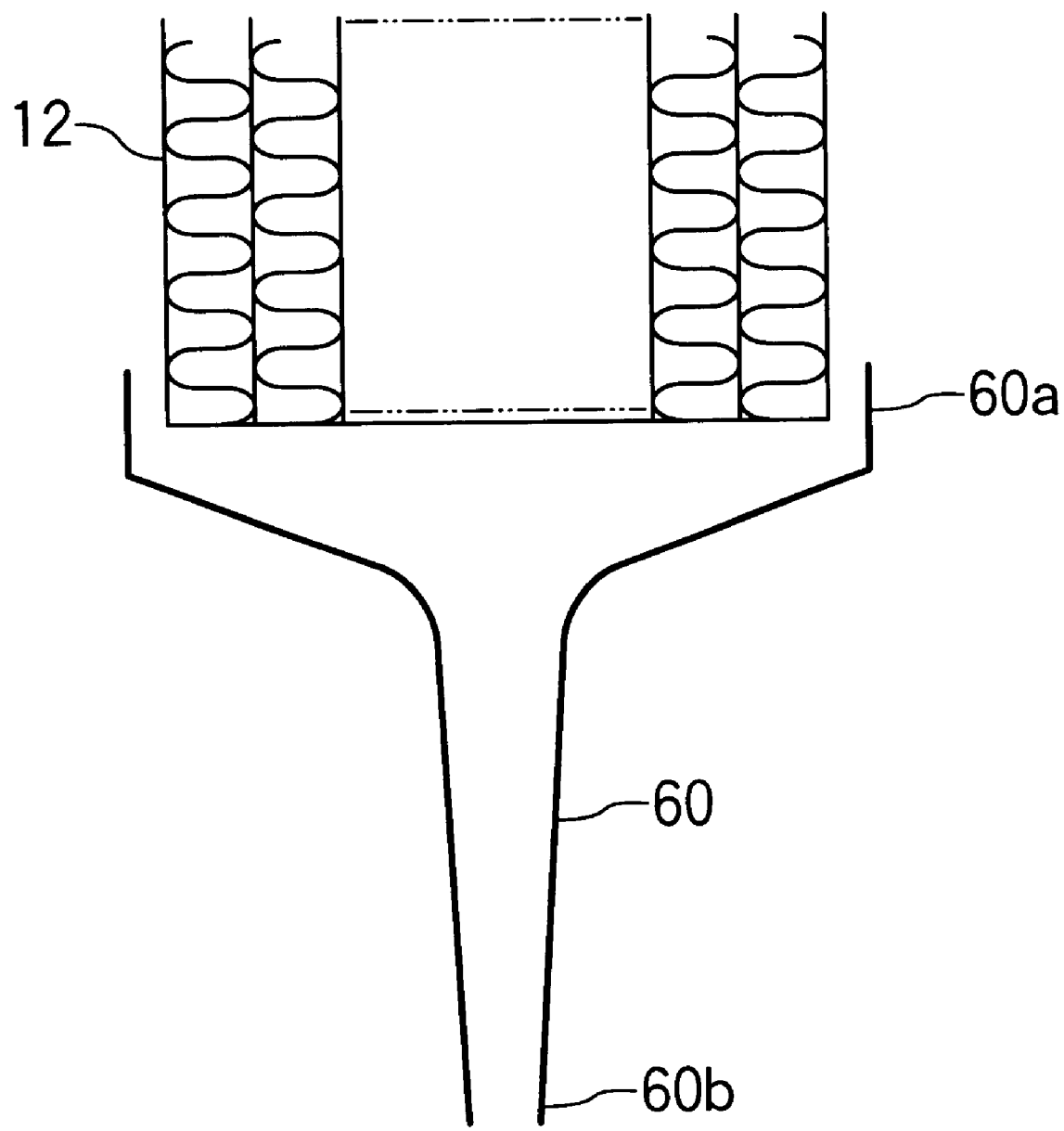
FIG. 17 is a fragmentary view taken in the direction of the arrow R in FIG. 16.

Referring now to FIGS. 16 and 17, an another example of the second embodiment will be described below. FIG. 16 is a cross-sectional view of the vehicle air conditioning system including a drain passage. FIG. 17 is a fragmentary view taken in the direction of the arrow R in FIG. 6. As shown in FIGS. 16 and 17, a drain passage 60 is connected to the bottom of the evaporator for draining a condensate produced in the evaporator 12. The drain passage 60 has a receptacle 60a conforming the lower configuration of the evaporator 12 and a lower end portion 60b extending to a position spaced oppositely from the drain pipe 54 attached to the floor panel 52. The drain passage 60 has a generally funnel-shaped configuration which provides a reduced flow resistance of the air. The drain passage 60 is firmly attached to a wall member 48a of the second heater core passage 48.

Figure 18:
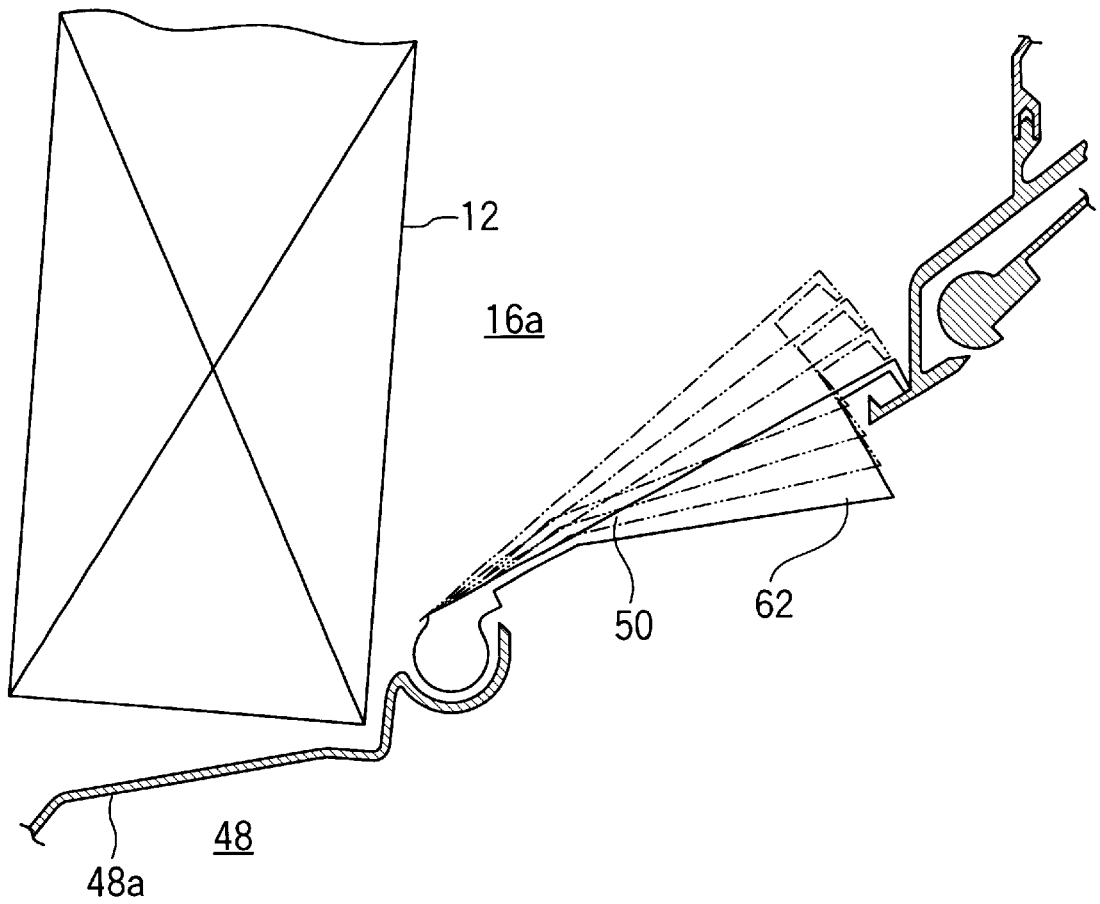
FIG. 18 is a partly enlarged view of an another example of the temperature controlling damper according to the second embodiment of the invention.

Next, referring to FIG. 18, an another example of the second embodiment will be described below. As shown in FIG. 18, the temperature controlling damper 50 of the second embodiment is operable to direct the air flow from the downstream side 16a of the air intake duct 16 directly toward the second heater core 48. A problem may arise when the temperature controlling damper 50 is in its slightly opened state in contrast to when in the fully or substantially opened state, because the high-velocity air drastically flows through a gap between the distal end of the damper 50 and the opposite wall of the duct 16 into the second heater core 48. Accordingly, the damper 50 when in its slightly opened state dose not provide a linear relationship between the amount of the air which flows through the evaporator 12 and the amount of the air which flows into the second heater core passage 48.

To overcome such problem, in one aspect of the second embodiment, advantageously, a projecting member 62 in the shape of a triangle as viewed in FIG. 18 can be secured to the temperature controlling damper 50 at its face facing the second heater core 48. When the temperature controlling damper 50 is the slightly opened state, the projecting member 62 provide an increased flow resistance for the air flowing into the second heater core passage 48 to prevent the drastic flow of the air thereinto, thereby making it possible to provide the linear relationship between the amount of the air which flows through the evaporator 12 and the amount of the air which flows into the second heater core passage 48.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An air conditioning system mountable in the rear of a vehicle having a vent mode and a foot mode, the air conditioning system comprising:

a casing;

an evaporator mounted at an upper front portion within the casing;

a heater core mounted below the evaporator such that an upper end of the heater core is located below a bottom end of the evaporator;

a vent outlet provided at an upper rear portion of the casing for allowing the air having a first selected final temperature to be discharged into a passenger compartment of the vehicle in the vent mode;

a foot outlet provided at a front portion of the casing for allowing the air having a second selected final temperature to be discharged into the passenger compartment in the foot mode;

a first bypass passage extending between a downstream side of the evaporator and the vent outlet;

a second bypass passage extending between the downstream side of the evaporator and the foot outlet;

a first heater core passage providing a fluid communication between the rear side of the heater core and the first bypass passage;

a second heater core passage providing a fluid communication between the front side of the heater core and the second bypass passage; and a temperature controlling damper for controlling a rate of air which is directed toward the heater core so as to attain the first or second selected temperature of the air for discharging into the passenger compartment of the vehicle, wherein said temperature controlling damper controls a proportion in which the rate of the air is divided into the first bypass passage and the second bypass passage.

2. A vehicle comprising:

a vehicle body having a passenger compartment; and an air conditioning system mounted in a rear of the vehicle body having a vent mode and a foot mode, the air conditioning system comprising:

a casing;

an evaporator mounted at an upper front portion within the casing;

a heater core mounted below the evaporator such that an upper end of the heater core is located below a bottom end of the evaporator;

a vent outlet provided at an upper rear portion of the casing for discharging the air having a first selected final temperature into the passenger compartment of the vehicle in the vent mode;

a foot outlet provided at a front portion of the casing for discharging the air having a second selected final temperature into the passenger compartment in the foot mode;

a first bypass passage extending between a downstream side of the evaporator and the vent outlet;

a second bypass passage extending between the downstream side of the evaporator and the foot outlet;

a first heater core passage providing a fluid communication between the rear side of the heater core and the first bypass passage;

a second heater core passage providing a fluid communication between the front side of the heater core and the second bypass passage; and a temperature controlling damper for controlling a rate of air which is directed toward the heater core so as to attain the first or second selected temperature of the air for discharging into the passenger compartment of the vehicle, wherein said temperature controlling damper controls a proportion in which the rate of the air is divided into the first bypass passage and the second bypass passage.

* * * * *